(12) United States Patent
Grosch et al.

(10) Patent No.: US 6,764,978 B2
(45) Date of Patent: Jul. 20, 2004

(54) MULTIMETAL CYANIDE COMPOUNDS

(75) Inventors: Georg Heinrich Grosch, Bad Dürkheim (DE); Edward Bohres, Ludwigshafen (DE); Raimund Ruppel, Dresden (DE); Kathrin Harre, Dresden (DE); Eva Baum, Schwarzheide (DE); Michael Stösser, Neuhofen (DE); Jeffery T. Miller, Baton Rouge, LA (US); Richard B. Prager, Westland, MI (US)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/229,979

(22) Filed: Aug. 28, 2002

(65) Prior Publication Data

US 2004/0044240 A1 Mar. 4, 2004

(51) Int. Cl.$^7$ ................................. B01J 27/26
(52) U.S. Cl. ........................... 502/175; 502/200
(58) Field of Search .................. 502/175, 200

(56) References Cited

U.S. PATENT DOCUMENTS 6,613,714 B2 * 9/2003 Grosch et al. .............. 502/175

| | | | |
|---|---|---|---|
| 2002/0006864 A1 * | 1/2002 | Grosch et al. | 502/175 |
| 2002/0032121 A1 * | 3/2002 | Grosch et al. | 502/175 |
| 2003/0013604 A1 * | 1/2003 | Grosch et al. | 502/175 |
| 2003/0149232 A1 * | 8/2003 | Hinz et al. | 528/412 |
| 2003/0199670 A1 * | 10/2003 | Grosch et al. | 528/425 |

FOREIGN PATENT DOCUMENTS

DE  197 42 978 A1 * 9/1997

* cited by examiner

Primary Examiner—Elizabeth D. Wood
(74) Attorney, Agent, or Firm—Fernando A. Borrego

(57) ABSTRACT

The invention relates to DMC catalysts which comprise at least 10% by weight, based on the weight of the DMC catalysts, of a crystalline multimetal cyanide compound whose X-ray diffractogram shows sharp reflections at least at the d values of 11.4 Å±0.5 Å
8.9 Å±0.5 Å
6.3 Å±0.5 Å
5.8 Å±0.5 Å
5.5 Å±0.5 Å
4.5 Å±0.5 Å
4.4 Å±0.5 Å
3.9 Å±0.4 Å
3.7 Å±0.4 Å
3.4 Å±0.4 Å.

5 Claims, No Drawings

MULTIMETAL CYANIDE COMPOUNDS

The invention relates to multimetal cyanide compounds which can be employed in particular as catalysts for the ring-opening polymerization of alkylene oxides, to a process for their preparation and to the use thereof as catalysts for the polymerization of alkylene oxides.

Multimetal cyanide catalysts, also referred to as DMC catalysts, are efficient catalysts for preparing polyetherols by ring-opening polymerization of alkylene oxides. Products of this type are used in industry for example as starting materials for preparing polyurethanes by reaction with polyisocyanates, as surface-active compounds or as base oils.

It is possible by using multimetal cyanide compounds as catalysts to prepare polyether alcohols with a reduced content of unsaturated byproducts. In addition, the rate of the addition of the alkylene oxides is distinctly higher compared with conventional basic catalysts, and thus the utilization of plants is distinctly greater.

The DMC catalysts also have disadvantages, however. Thus, initiation of the reaction may be retarded at the start of the reaction. This retardation is also frequently referred to as the induction period. A further disadvantage is the formation of very high molecular weight fractions in the polyether alcohol. These high molecular weight fractions may have very disadvantageous effects during the further processing to polyurethanes.

One possibility for overcoming these disadvantages is to improve the DMC catalysts. A large number of structures of DMC catalysts is described in the prior art.

WO 99/16775 describes crystalline monoclinic DMC catalysts which have higher catalytic activity than the amorphous DMC catalysts preferred until then. It has, however, emerged that these catalysts also have an induction period which is too long.

It is an object of the present invention to provide crystalline DMC catalysts which are distinguished by increased catalytic activity and with which, on use for the polymerization of alkylene oxides, the induction period is distinctly reduced.

We have found that this object is achieved by DMC catalysts which comprise at least 10% by weight of a crystalline monoclinic multimetal cyanide compound whose X-ray diffractogram shows sharp reflections at least at the d values of 11.4 Å±0.5 Å
8.9 Å±0.5 Å
6.3 Å±0.5 Å
5.8 Å±0.5 Å
5.5 Å±0.5 Å
4.5 Å±0.5 Å
4.4 Å±0.5 Å
3.9 Å±0.5 Å
3.7 Å±0.5 Å
3.4 Å±0.5 Å and have a particularly high catalytic activity, and addition of alkylene oxides using such catalysts shows only a short induction period.

The invention accordingly relates to DMC catalysts which comprise at least 10% by weight, based on the weight of the DMC catalysts, of a crystalline multimetal cyanide compound whose X-ray diffractogram shows sharp reflections at least at the d values of 11.4 Å±0.5 Å
8.9 Å±0.5 Å
6.3 Å±0.5 Å
5.8 Å±0.5 Å
5.5 Å±0.5 Å
4.5 Å±0.5 Å
4.4 Å±0.5 Å
3.9 Å±0.4 Å
3.7 Å±0.4 Å
3.4 Å±0.4 Å.

The invention further relates to a process for preparing the DMC catalysts of the invention, and to the use thereof as catalysts for polymerizing alkylene oxides.

The X-ray diffractograms were determined at a wavelength of 1.5406Å at room temperature. The other multimetal cyanide compounds of the DMC catalysts of the invention may be crystalline or amorphous, preferably crystalline. They are, in particular, multimetal cyanide compounds having the same molecular formula as the multimetal cyanide compounds having the structure described above. In a particular embodiment of the invention, the other multimetal cyanide compounds are crystalline and monoclinic.

The DMC catalysts may also consist completely of the multimetal cyanide compound defined above. When the content of the multimetal cyanide compound characterized in detail above is below 10% by weight, the beneficial effect of the compound on the catalytic properties of the DMC catalysts is detectable to only a very small extent.

In an advantageous embodiment of the DMC catalysts of the invention, the multimetal cyanide compound characterized in detail above exhibits a triclinic crystal system. The unit cell of this triclinic crystal system preferably has the following lattice parameters:

$a=13.3$ Å±0.5 Å
$b=13.3$ Å±0.5 Å
$c=9.3$ Å±0.5 Å
$\acute{a}=98.4°±1°$
$\hat{a}=99.9°±1°$
$\tilde{a}=116.2°±1°$ In a particularly preferred embodiment of the DMC catalysts of the invention, the triclinic multimetal cyanide compounds show the following reflections:

11.4 Å±0.5 Å
8.9 Å±0.5 Å
6.3 Å±0.5 Å
5.8 Å±0.5 Å
5.5 Å±0.5 Å
4.5 Å±0.5 Å
4.4 Å±0.5 Å
3.9 Å±0.4 Å
3.7 Å±0.4 Å
3.5 Å±0.5 Å
3.4 Å±0.4 Å
3.1 Å±0.4 Å
2.9 Å±0.3 Å
2.41 Å±0.09 Å
2.37 Å±0.09 Å
2.31 Å±0.09 Å
2.25 Å±0.09 Å.

The multimetal cyanide compounds of the invention preferably have the general formula (I)

$$M^1_a[M^2(CN)_b(A)_c]_d \cdot fM^1_g X_n \cdot h(H_2O) \cdot eL \cdot kP \qquad (I),$$

where $M^1$ is a metal ion selected from the group comprising $Zn^{2+}$, $Fe^{2+}$, $Co^{3+}$, $Ni^{2+}$, $Mn^{2+}$, $Co^{2+}$, $Sn^{2+}$, $Sn^{4+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Cu^{2+}$, $La^{3+}$, $M^2$ is a metal ion selected from the group comprising $Fe^{2+}$, $Fe^{3+}$, $Co^{2+}$, $Co^{3+}$, $Mn^{2+}$, $Mn^{3+}$, $Ni^{2+}$, $V^{4+}$, $V^{5+}$, $Cr^{2+}$, $Cr^{3+}$, $Rh^{3+}$, $Ru^{2+}$, $Ir^{3+}$, and $M^1$ and $M^2$ are different, A is an anion selected from the group comprising halide, hydroxide, sulfate, carbonate, cyanide, thiocyanate, isocyanate, cyanate, carboxylate, oxalate or nitrate, X is an anion selected from the group comprising halide, hydroxide, sulfate, carbonate, cyanide, thiocyanate, isocyanate, cyanate, carboxylate, oxalate, nitrate or nitrite ($NO_2^-$), and the uncharged species CO, $H_2O$ and NO, L is a water-miscible ligand selected from the group comprising alcohols, aldehydes, ketones, ethers, polyethers, esters, polyesters, polycarbonate, ureas, amides, nitrites and sulfides or mixtures thereof, P is an organic additive selected from the group comprising polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co maleic acid), polyacrylonitrile, poly(alkyl acrylates), poly(alkyl methacrylates), polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose, polyacetates, ionic surface-active compounds, bile acid or salts, esters or amides thereof, carboxylic esters of polyhydric alcohols and glycosides, and a, b, d, g and n are integral or fractional numbers greater than zero, c, f, e, h and k are integral or fractional numbers greater than or equal to zero, where a, b, c, and d, and q and n, are selected so that electrical neutrality is ensured.

For preference, f and k may be zero only if c is not zero and A is exclusively carboxylate, oxalate or nitrate.

The multimetal cyanide compounds of the invention are prepared by combining an aqueous solution of a cyanometalate compound, in particular of a cyanometallic acid or of a cyanometalate salt, with the aqueous solution of a metal salt of the general formula $M^1{}_m(X)_n$ where the symbols have the meaning explained above. A stoichiometric excess of the metal salt is used for this purpose. The molar ratio of metal ion to the cyanometalate component is preferably from 1.1 to 7.0, preferably 1.2 to 5.0 and particularly preferably from 1.3 to 3.0. It is advantageous to add the cyanometalate compound to the metal salt solution, but the converse procedure is also possible. Thorough mixing, for example by stirring, is necessary during and after the precursor solutions are combined.

The content of cyanometalate compound in the aqueous solution, based on the weight of aqueous solution, is from 0.1 to 30% by weight, preferably 0.1 to 20% by weight, in particular 0.2 to 10% by weight. The content of the metal salt component in the metal salt solution, based on the weight of metal salt solution, is from 0.1 to 50% by weight, preferably 0.2 to 40% by weight, in particular 0.5 to 30% by weight.

It is preferred for at least one of the aqueous solutions of the starting materials to comprise a heteroatom-containing ligand as referred to as L and explained in the general formula (I). The heteroatom-containing ligands may also be added only after the two precursor solutions have been combined to result in a suspension, and once again care must be taken that mixing is thorough.

The content of heteroatom-containing ligands, if such compounds are employed in the suspension resulting after the precipitation should be from 1 to 60% by weight, preferably 5 to 40% by weight, in particular 10 to 30% by weight.

To adjust the morphology of the multimetal cyanide compounds it has proved suitable to carry out the preparation of these compounds in the presence of surface-active substances. The surface-active substances are usually already present in at least one of the two solutions. The surface-active substances are preferably added to the solution in which the precipitation takes place. The content of surface-active substances in the precipitation solution, based on the total weight of the precipitate suspension, is preferably between 0.01 and 40% by weight, in particular between 0.05 and 30% by weight. Another preferred embodiment provides for the surface-active substances to be distributed pro rata between the two precursor solutions.

In another preferred embodiment of the preparation of the multimetal cyanide compounds, the reaction of the metal salt with the cyanometalate compound takes place in two stages. This entails initial preparation of a catalytically inactive phase of the multimetal cyanide compound, and subsequent conversion of the latter by recrystallization into a catalytically active phase of the multimetal cyanide compound. Various measures are possible for the recrystallization. Thus, it is possible to add further precursor solutions, especially the solution of the metal salt, to the suspension resulting after the reaction. A further possibility is to alter the temperature of the precipitate suspension after the precipitation is complete, in particular to heat the suspension. A further possibility is to add further heteroatom-containing ligands and/or surface-active substances to the precipitate suspension after the precipitation is complete. A further possibility is to alter the pH of the precipitate suspension.

In a particularly preferred embodiment of the process of the invention, initially a multimetal cyanide compound which is, in particular, crystalline is prepared as described for example in WO 99/16775. This compound can then be converted in a further step, for example by a thermal treatment, preferably in the presence of an inert gas, into the multimetal cyanide compound of the invention.

To carry out the thermal treatment, the multimetal cyanide compound can be removed from the precipitate suspension and dried. In one embodiment of the process, the multimetal cyanide compound can also be subjected to the thermal treatment in the precipitate suspension. In a further embodiment of the process, the multimetal cyanide compound prepared by conventional processes can be added to the starting substance employed to prepare the polyether alcohols, and this mixture can be subjected to the thermal treatment, where appropriate under vacuum and/or while passing an inert gas through.

The thermal treatment is preferably carried out at a temperature in the range between 90 and 200° C., in particular between 100 and 160° C.

The preparation according to the invention of polyether alcohols takes place, as stated, by addition of alkylene oxides onto the H-functional starting substances using the catalysts described.

Alkylene oxides which can be used are all known alkylene oxides, for example ethylene oxide, propylene oxide, butylene oxide, styrene oxide. The alkylene oxides which are employed in particular are ethylene oxide, propylene oxide and mixtures of said compounds.

The starting substances employed are H-functional compounds. Alcohols with a functionality of from 1 to 8, preferably 2 to 8, are employed in particular. Starting substances employed for preparing polyether alcohols employed for flexible polyurethane foams are, in particular, alcohols having a functionality of from 2 to 4, in particular of 2 and 3. Examples are ethylene glycol, propylene glycol, glycerol, trimethylolpropane, pentaerythritol. It is advantageous in the addition of alkylene oxides using DMC catalysts to employ, together with or in place of said alcohols, the products of the reaction thereof with alkylene oxides, in particular propylene oxide. Compounds of this type preferably have a molecular weight of up to 500 g/mol. Addition of the alkylene oxides in the preparation of the products of this reaction can take place with any suitable catalysts, for example with basic catalysts. The polyether alcohols for preparing flexible polyurethane foams mostly have a hydroxyl number in the range between 20 and 100 mgKOH/g.

In general, all the starting substance is activated and then the alkylene oxide is metered in.

In a particular embodiment of the preparation of polyether alcohols, only part of the starting substance is present initially, and the reaction is started by adding alkylene oxide. This is followed by metering in of further starting substance, at least for part of the reaction, and of alkylene oxide. This procedure is described, for example, in EP 879 259. It is possible by this design of the process to suppress the formation of very high molecular weight fractions in the polyether alcohol.

Starting substances employed to prepare surface-active compounds are, in particular, difunctional alcohols. Starting substances employed to prepare base oils are, in particular, monofunctional alcohols having 5 to 20 carbon atoms in the main chain.

The addition of alkylene oxides in the preparation of the polyether alcohols can take place by known processes. Thus, it is possible for the polyether alcohols to comprise only one alkylene oxide. If a plurality of alkylene oxides is used there is the possibility of so-called blockwise addition, in which the alkylene oxides are successively added singly, or of so-called random addition, in which the alkylene oxides are metered in together. It is also possible in the preparation of the polyether alcohols to incorporate both blockwise and random sections in the polyether chain. The alkylene oxides are mostly added blockwise to prepare surface-active compounds and base oils.

Flexible polyurethane block foams are prepared preferably by using polyether alcohols with a high content of secondary hydroxyl groups and a maximum content of ethylene oxide units in the polyether chain of 30% by weight, based on the weight of the polyether alcohol. These polyether alcohols preferably have a propylene oxide block at the end of the chain. Molded flexible polyurethane foams are prepared in particular by using polyether alcohols with a high content of primary hydroxyl groups and an ethylene oxide end block in an amount of <20% of the weight of the polyether alcohol.

Addition of the alkylene oxides takes place under the usual conditions at temperatures in the range from 60 to 180° C., preferably between 90 and 140° C., in particular between 100 and 130° C., and under pressures in the range from 0 to 20 bar, preferably in the range from 0 to 10 bar and in particular in the range from 0 to 5 bar. The mixture of starting substance and DMC catalyst can be pretreated by stripping as disclosed in WO 98/52689 before starting the alkoxylation.

After the addition of the alkylene oxides is complete, the polyether alcohol is worked up by conventional processes, by removing unreacted alkylene oxides and volatile constituents, normally by distillation, steam or gas stripping and/or other deodorizing methods. A filtration may also take place if necessary.

The polyether alcohols prepared in this way can be used, for example, for preparing polyurethanes, as surfactants or as base oils.

It is possible by the use of the DMC catalysts of the invention surprisingly to prepare polyether alcohols which have very good properties. In particular, the induction time at the start of the reaction is distinctly reduced.

The invention is to be explained in more detail by the following examples.

Catalyst Preparation

EXAMPLE 1

Comparative

Preparation of the DMC Catalyst as Disclosed in WO 99/16775

1 000 g of aqueous hexacyanocobaltic acid (cobalt content: 9 g/l cobalt) were introduced into a 2 l reactor equipped with a turbine agitator, dip tube for metering, pH electrode, conductivity measuring cell and scattered light probe and heated while stirring to 50° C. Then, while stirring (stirring power 1 W/l), 588 g of aqueous zinc acetate dihydrate solution (zinc content: 2.6% by weight), which was likewise at 50° C., were fed in over the course of 45 min.

After the addition, 20 g of a surface-active compound (Pluronic® PE 6200 from BASF Aktiengesellschaft) were added. The mixture was heated to 55° C. and stirred at this temperature for a further 20 minutes. Then 189 g of aqueous zinc acetate dihydrate solution (zinc content: 2.6% by weight) were metered in while stirring at 55° C. over the course of 20 min. The conductivity began to fall after a few minutes. The suspension was stirred at this temperature until the pH of the suspension had fallen from 4.03 to 3.41 and remained constant. The precipitate suspension obtained in this way was filtered and washed with about 600 ml of water. The resulting catalyst was then dried at 50° C. overnight.
Composition:
Co: 12.8% by weight; Zn: 28.7% by weight
X-ray investigation of this catalyst shows the X-ray diffractogram reflections indicated in WO 99/16775

EXAMPLE 2

According to the Invention 10 g of the solid prepared above were introduced into a Schlenk vessel. The solid was then subjected to the following thermal treatment under a stream of dry nitrogen (nitrogen stream: 20 l/h):

The solid was heated from room temperature to 100° C. over the course of 2 h and kept at 100° C. for 1 h. The temperature was then raised over the course of a further hour to 150° C., and the solid was kept at 150° C. for 3 h. After completion of the heat treatment, the solid was cooled at a rate of 2° C./min.

The solid produced in this way was stored under an argon atmosphere. The XRD spectrum of this catalyst, recorded under a nitrogen atmosphere, shows the formation of the novel phase of the invention as described above.

Production of Base Oils Using DMC

EXAMPLE 3

Comparative

Production of Base Oil Using DMC 0.225 g of dried DMC catalyst from example 1 was introduced by the Schlenk technique into a dry 20 l autoclave ventilated with nitrogen. In addition, 2 796 g of dried Tridekanol N which had been stored under dry nitrogen were metered into the reactor through a metering line.

The stirred autoclave was then heated with stirring to 120° C. and evacuated by a vacuum pump to an internal pressure below 20 mbar abs. The autoclave was kept under these conditions for 1 h. The vacuum was then broken with nitrogen, and the internal pressure in the autoclave was adjusted to 1.2 bar abs.

The stirred autoclave was then heated to 150° C. 100 g of propylene oxide were metered in at a temperature of 150° C., and the start of the reaction was awaited. The start of the reaction was detected after 30 min through the fall in the pressure in the reactor.

Then, over the course of 7 h, 10 586 g of propylene oxide were fed in at a temperature of 150° C. The catalyst became inactive toward the end of the reaction. The unreacted propylene oxide was removed from the autoclave by means of vacuum.

13 281 g of product were obtained. The prepared product had a viscosity of 40 mm²/s at a temperature of 40° C.

EXAMPLE 4

According to the Invention
Production of Base Oil Using DMC 0.225 g of dried DMC catalyst from example 2 was introduced by the Schlenk technique into a dry 20 l autoclave ventilated with nitrogen. In addition, 2 796 g of dried Tridekanol N which had been stored under dry nitrogen were metered into the reactor through a metering line.

The stirred autoclave was then heated with stirring to 120° C. and evacuated by a vacuum pump to an internal pressure below 20 mbar abs. The autoclave was kept under these conditions for 1 h. The vacuum was then broken with nitrogen, and the internal pressure in the autoclave was adjusted to 1.2 bar abs.

The stirred autoclave was then heated to 150° C. 100 g of propylene oxide were metered in at a temperature of 150° C., and the start of the reaction was awaited. The start of the reaction was detected after 4 min through the fall in the pressure in the reactor.

Then, over the course of 4 h, 12 096 g of propylene oxide were fed in at a temperature of 150° C. After the metering was complete, the propylene oxide completely reacted within 10 min. 14 985 g of product were obtained. The prepared product had a viscosity of 52 mm²/s at a temperature of 40° C.

We claim:

1. A DMC catalyst which comprises at least 10% by weight, based on the weight of the DMC catalyst, of a crystalline multimetal cyanide compound whose X-ray diffractogram shows sharp reflections at least at the d values of 11.4 Å±0.5 Å
8.9 Å±0.5 Å
6.3 Å±0.5 Å
5.8 Å±0.5 Å
5.5 Å±0.5 Å
4.5 Å±0.5 Å
4.4 Å±0.5 Å
3.9 Å±0.4 Å
3.7 Å±0.4 Å
3.4 Å±0.4 Å.

2. A DMC catalyst as claimed in claim 1, wherein the crystalline multimetal cyanide compound exhibits a triclinic crystal system.

3. A DMC catalyst as claimed in claim 1, wherein the crystalline multimetal cyanide compound displays a triclinic crystal system with the lattice parameters a=13.3 Å±0.5 Å
b=13.3 Å±0.5 Å
c=9.3 Å±0.5 Å
á=98.4±1
â=99.9±1
ã=116.2±1.

4. A DMC catalyst as set forth in claim 1, wherein the crystalline multimetal cyanide compound has the formula (I)

$$M^1_a[M^2(CN)_b(A)_c]_d \cdot fM^1_g X_n \cdot h(H_2O) eL \cdot kP \quad (I),$$

where

M¹ is a metal ion selected from the group comprising $Zn^{2+}$, $Fe^{2+}$, $Co^{3+}$, $Ni^{2+}$, $Mn^{2+}$, $Co^{2+}$, $Sn^{2+}$, $Sn^{4+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Cu^{2+}$, $La^{3+}$, M² is a metal ion selected from the group comprising $Fe^{2+}$, $Fe^{3+}$, $Co^{2+}$, $Co^{3+}$, $Mn^{2+}$, $Mn^{3+}$, $Ni^{2+}$, $V^{4+}$, $V^{5+}$, $Cr^{2+}$, $Cr^{3+}$, $Rh^{3+}$, $Ru^{2+}$, $Ir^{3+}$, and M¹ and M² are different, A is an anion selected from the group comprising halide, hydroxide, sulfate, carbonate, cyanide, thiocyanate, isocyanate, cyanate, carboxylate, oxalate or nitrate, X is an anion selected from the group comprising halide, hydroxide, sulfate, carbonate, cyanide, thiocyanate, isocyanate, cyanate, carboxylate, oxalate, nitrate or nitrite ($NO_2^-$), and the uncharged species CO, $H_2O$ and NO, L is a water-miscible ligand selected from the group comprising alcohols, aldehydes, ketones, ethers, polyethers, esters, polyesters, polycarbonate, ureas, amides, nitriles and sulfides or mixtures thereof, P is an organic additive selected from the group-comprising polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, poly(alkyl acrylates), poly(alkyl methacrylates), polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose, polyacetates, ionic surface-active compounds, bile acid or salts, esters or amides thereof, carboxylic esters of polyhydric alcohols and glycosides, and a, b, d, g and n are integral or fractional numbers greater than zero, c, f, e, h and k are integral or fractional numbers greater than or equal to zero, where a, b, c, and d, and q and n, are selected so that electrical neutrality is ensured.

5. A process for preparing a DMC catalyst as set forth in any of claims 1 to 4, comprising the steps of a) preparation of a crystalline multimetal cyanide compound, b) thermal treatment of the multimetal cyanide compound.

* * * * *